United States Patent Office 2,778,958
Patented Jan. 22, 1957

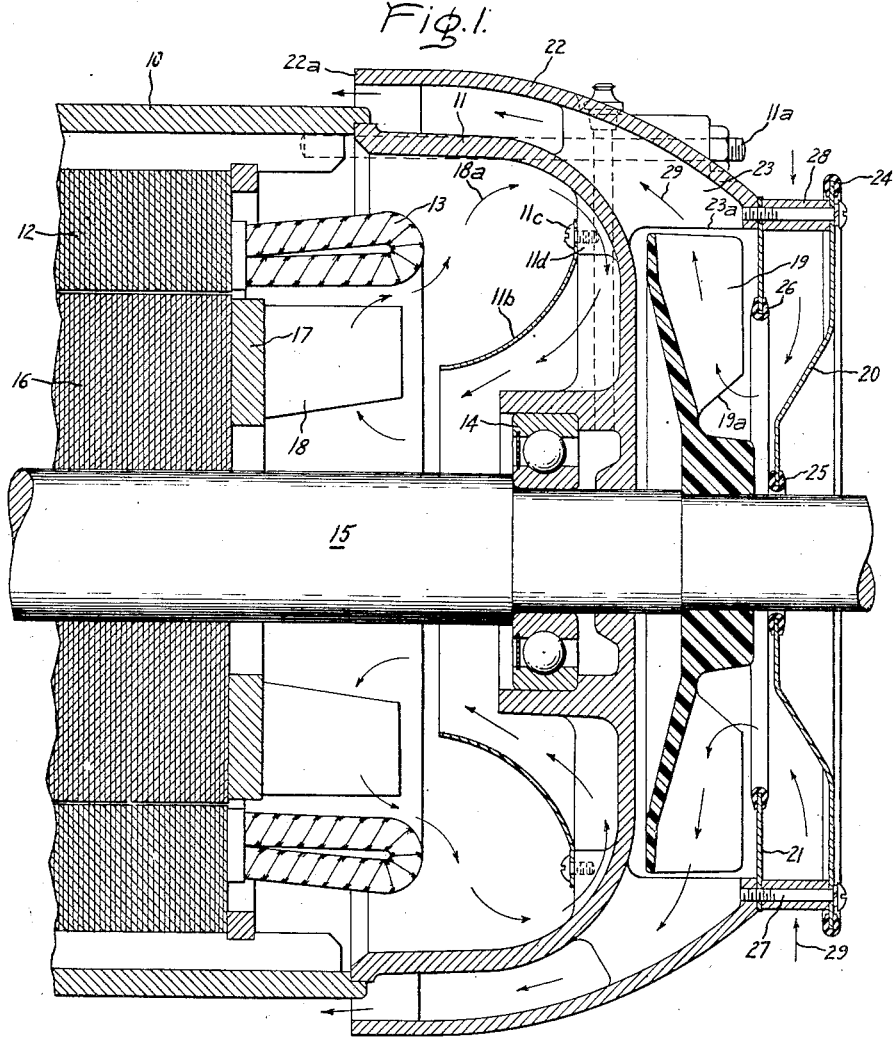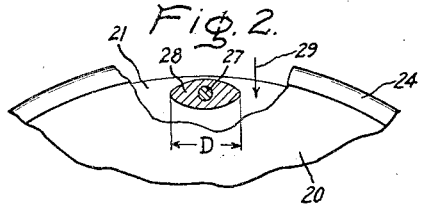

2,778,958
DYNAMOELECTRIC MACHINE

Clarence L. Hamm, Marblehead, Mass., and Frederick W. Baumann, Scotia, N. Y., assignors to General Electric Company, a corporation of New York Application October 28, 1954, Serial No. 465,176

2 Claims. (Cl. 310—57)

Our invention relates to dynamoelectric machines and has particular significance in connection with a totally enclosed fan cooled motor of the type adapted to be used in a lint laden atmosphere as in a textile plant.

Heretofore there has been quite a problem in connection with the ventilation of motors for operation in atmospheres laden with lint, dust, or other fibrous materials. If an open motor is used the lint clogs the bearings, air gap, and other portions involving relatively moving parts, and may seriously interfere with operation of the machine. If a totally enclosed type motor is used, it must either be of prohibitively large size, or must be provided with some external cooling arrangement which operates in the lint laden atmosphere and results in problems caused by the tendency of the lint to clog any and all screens, ducts and fans. Accordingly, it is an object of our invention to provide a totally enclosed fan cooled motor which overcomes these problems in a simple and inexpensive manner.

Another object of our invention is to provide a dynamoelectric machine design capable of operating in an atmosphere laden with lint or other fibrous materials without the necessity for frequent cleaning.

Other objects and advantages of our invention will become apparent and our invention will be better understood from consideration of the following description taken in connection with the accompanying drawing, in which:

Fig. 1 is a longitudinal view in section of a portion of a totally enclosed fan cooled dynamoelectric machine constructed in accordance with our invention;

Fig. 2 is an end view, partly in section, showing design of a spacer for preventing clogging of passages in an air circuit externally of the machine.

In motor and generator parlance, a fan cooled machine, particularly if totally enclosed, is not merely one having usual fan blades associated with the rotor and circulating air within the motor housing around and between rotor and stator members, but is one which also has a fan outside the housing which forces air in a separate path around and over the housing to cool it and thus to cool the inner air and the rotor and stator members.

In accordance with one aspect of the present invention, we provide a lint free totally enclosed fan cooled motor by designing a totally enclosed motor having an external fan and a screenless external air path comprising radially extending baffles for conducting incoming air to the fan at its center and a substantially axially extending shroud spaced from an end bell of the motor for directing air from the fan over a major part of the motor housing. In this external air path all openings are larger in dimension than the maximum length of the lint in the atmosphere so that the lint can not bridge the openings, all ducts are gently curved (or may not be curved at all) and are free of sharp edges and small parts, such as spacers separating the radially extending baffles, are of large diameter so that the lint can not become wrapped therearound, and the fan is provided with a smooth leading edge which is not disposed at a right angle to the air stream. To meet the design requirements and to eliminate a safety hazard otherwise present when an exposed fan is used, a solid baffle spaced from the shroud is provided to prevent the insertion of a hand or tool into the fan.

As shown in the drawing, the machine has an inner casing comprising a stator yoke or frame 10 with an end bell 11 secured to the end thereof. Frame 10 supports a laminated stator core 12 having a stator winding 13, and end bell 11 carries a bearing assembly 14 supporting an end of shaft 15 which carries a rotor core 16. The rotor core has a cast winding 17 and usual fan blades 18 for circulating a ventilating medium, such as air, within the totally enclosed housing formed by frame 10 and the end bells (of which only one is shown at 11). As shown, the end bell 11 is held on the frame by a plurality of threaded studs of which one is shown at 11a. An internal air baffle 11b is secured to the inside of the bell by screws 11c which are secured to tapped bosses 11d on end bell 11. By mounting baffle 11b on bosses 11d it is spaced from end bell 11 to provide a return path for the circulating air which is forced past the windings 13 by fan blades 18. This construction is important in providing a large volume of internal recirculating air flow, as indicated by the arrows 18a, to prevent hot spots within the motor and to increase the heat transferred to end bell 11.

In accordance with our invention there is provided an external fan 19 secured to the shaft 15 outside the end bell 11. There is also provided an axially outermost baffle plate 20 cooperating with an axially spaced baffle 21 for directing external air to the center of the fan 19. The end bell 11 is provided with an outer shroud ring 22, and air straightening vanes 23 are circumferentially spaced from each other and serve to space the shroud 22 from bell 11 and direct air axially so that eventually it passes out of the shroud 22 and over the outside of the frame 10 to cool the stator core by heat conduction through the frame and to this external air. It will be noted that trailing edge 22a of shroud 22 extends beyond the end of frame 10 to overlap the same. It will also be noted that the edge 22a is more closely spaced to frame 10 than shroud 22 is to end bell 11 to result in the smallest cross section of the external air path at this point. This prevents the formation of a relatively low pressure area adjacent the outer surface of end 11 to insure the maximum amount of air coming into contact therewith for maximum heat pickup. In addition, this construction increases the velocity of the cooling air and, due to the overlap of the trailing edge 22a of shroud 22, directs the air over the outer surface of frame 10 closely hugging such surface for maximum heat transfer.

In order that all surfaces will be smooth the inner and outer peripheries of baffle plate 20 are provided with rounded edgings 24 and 25, respectively, and the inner periphery of the axially inner baffle 21 is provided with like edging 26. Such edging may be of plastic, or rubber, leather or like material, and edging 25 desirably has an ample clearance between itself and the shaft because the efficiency of the fan is not impaired by leakage at this point and it is preferable to make all clearances between relatively movable parts of the external air circuit of such large size that they will not clog up with lint.

The baffles 20 and 21 are spaced from each other and held on the outer shroud by bolts 27 surrounded by circumferentially separated spacers 28 arranged so that incoming air may flow between the spacers, between the baffles 20 and 21 and out between the blades of fan 19, and then out between the vanes 23 and between outer shroud 22 and end bell 11 as indicated by the arrows 29.

We have found that for most any application of a motor (or generator) in a lint laden atmosphere the lint is made up of strands having a maximum length which may be easily predetermined by the design engineer upon inquiry. In accordance with one aspect of the present invention, we have designed spacers 28 which are normal or perpendicular to the external air flow with a width greater than this predetermined maximum length of lint fibres, and we have found that this means, at least if the surfaces are curved, that the fibres will blow off of these spacers and never wrap around them to initiate the clogging of the air path. This may be more clear from consideration of Fig. 2. If it be assumed that the predetermined maximum length of lint fibres to be encountered by the machine is one inch, then the dimension D representing the width of the spacer 28 more or less normal to the external air flow should be about 1¼" and the spacers may be made round, or of an elliptic cross section as shown, and the fibres will never come to rest thereupon because the spacers are not streamlined (with regard to flow) or otherwise so narrow as to permit balanced hanging of ends of the same strand along opposite sides.

The fan 19 may be of any suitable type and is preferably formed of a moulded plastic material. It is important, however, that the leading edge 19a of the fan be smooth and be tapered away from the shaft so that it is not presented normally of the air path. With this construction any lint which may tend to lodge thereon will be removed therefrom under the combined influence of centrifugal force and the air current. Further, it is important that the outer edge of the blades of fan 19 be dimensioned to provide a very small clearance with the leading edge 23a of vane. In this way, any lint clinging to leading edge 23a will be wiped therefrom by the rotating fan blades.

Although the external cooling arrangement has been shown and described specifically in connection with one end of the motor only, it is apparent that such an arrangement could likewise be placed on the opposite end of the machine in the event such an arrangement is needed for increasing the heat transfer from the machine above that which would be obtained where the cooling arrangement is at one end of the machine only. It is likewise apparent that while our improved construction is useful at atmospheres which are laden with dust or fibrous materials other than lint, and while we have illustrated and described a particular embodiment of our invention, various modifications will obviously be apparent to those skilled in the art. We desire it to be understood, therefore, that our invention is not to be limited to the particular arrangement disclosed and we intend in the appended claims to cover all modifications which do not depart from the true spirit and scope of our invention.

What we claim as new and desire to secure by Letters Patent of the United States is:

1. A totally enclosed dynamoelectric machine for use in dust or fibrous laden air containing fibers of predetermined maximum length, said machine consisting of a stator frame and end bells, a stator and a rotor in said frame and a circulator for passing fluid past said rotor and stator into heat exchange relationship with said frame and end bells, the improvement comprising a cooling air circuit external to said machine including a rotor shaft extension protruding through one of said end bells for receiving a machine cooling fan, air directing means respectively encompassing a portion of said frame and an adjacent end bell and having an inlet adjacent the discharge end of said fan, air straightening vanes in said air directing means channeling air from said fan over said adjacent end bell and the outer peripheral surface of said frame, baffle means attached to said air directing means and positioned axially outward from said fan, said baffle means comprising a first baffle surrounding said shaft and having a central opening positioned in parallel relationship with said fan, a second baffle of solid construction around said shaft spaced by spacer means from said first baffle, said spacer means being of a greater diameter in a direction generally normal to flow of ventilating medium than said predetermined maximum length of fibers, whereby said fan draws cooling air radially inwardly and discharges same in an opposite direction outwardly past said adjacent end bell and said stator frame for effecting cooling of said machine.

2. A totally enclosed dynamoelectric machine for use in dust or fibrous laden air containing fibers of predetermined maximum length, said machine consisting of a stator frame and end bells, a stator and a rotor in said frame and a circulator for passing fluid past said rotor and stator into heat exchange relationship with said frame and end bells, the improvement comprising a cooling air circuit external to said machine including a rotor shaft extension protruding through one of said end bells for receiving a machine cooling fan, said fan having blades provided with smooth leading edges fixed at an angle less than normal to the air flow thereinto, a shroud affixed to said machine having one end adjacent the discharge side of said fan and the other positioned in close proximity to said frame for increasing the velocity of cooling air over the outer surface of the frame to effect maximum heat transfer, air directing vanes between one of said end bells and said shroud and being provided with leading edges closely spaced from said fan for simultaneously straightening the flow of air and for wiping dust or fibrous particles lodging on the leading edges of said vanes, a pair of spaced baffles attached to said shroud and positioned in parallel relationship with said fan for directing cooling air to the center thereof, and spacer means of a diameter greater than the maximum length of said fibers separating said baffles for precluding the lodging of any fibers thereon, thereby providing a smooth and uninterrupted flow of air thru said baffles to said fan and outwardly past said end bell and frame for cooling said machine.

References Cited in the file of this patent
UNITED STATES PATENTS

| | | |
|---|---|---|
| 1,628,086 | Warner | May 10, 1927 |
| 1,761,783 | Freiburghouse | June 3, 1930 |
| 1,899,741 | Bauer | Feb. 28, 1933 |
| 2,043,655 | Ehrmann | June 9, 1936 |

FOREIGN PATENTS

| | | |
|---|---|---|
| 72,424 | Switzerland | Aug. 16, 1916 |
| 716,297 | France | Oct. 6, 1931 |
| 772,303 | France | Aug. 13, 1934 |